(12) United States Patent
Mori

(10) Patent No.: US 12,534,417 B2
(45) Date of Patent: Jan. 27, 2026

(54) COATED TOOL AND CUTTING TOOL

(71) Applicant: KYOCERA CORPORATION, Kyoto (JP)

(72) Inventor: Satoshi Mori, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 253 days.

(21) Appl. No.: 18/258,810

(22) PCT Filed: Dec. 15, 2021

(86) PCT No.: PCT/JP2021/046379
§ 371 (c)(1),
(2) Date: Jun. 22, 2023

(87) PCT Pub. No.: WO2022/138400
PCT Pub. Date: Jun. 30, 2022

(65) Prior Publication Data
US 2024/0043351 A1 Feb. 8, 2024

(30) Foreign Application Priority Data
Dec. 25, 2020 (JP) .................. 2020-217989

(51) Int. Cl.
*C04B 41/89* (2006.01)
*B23B 27/14* (2006.01)
(Continued)

(52) U.S. Cl.
CPC .............. *C04B 41/89* (2013.01); *B23B 27/14* (2013.01); *C04B 35/5831* (2013.01);
(Continued)

(58) Field of Classification Search
CPC ..... C04B 41/89; C04B 35/5831; C04B 41/52; B23B 27/14; B23B 2228/105; Y10T 428/24975
See application file for complete search history.

(56) References Cited

U.S. PATENT DOCUMENTS 6,082,936 A 7/2000 Moriguchi et al.
8,178,220 B2 * 5/2012 Okamura ................ C04B 41/87
204/192.1
(Continued)

FOREIGN PATENT DOCUMENTS

JP  55137803 A * 10/1980
JP  S55137803 A  10/1980
(Continued)

OTHER PUBLICATIONS

[NPL-1] Abe et al. (JP S55-137803 A); Oct. 28, 1980 (Japanese Patent Office machine translation to English). (Year: 1980).*

*Primary Examiner* — Donald M Flores, Jr.
(74) *Attorney, Agent, or Firm* — HAUPTMAN HAM, LLP

(57) ABSTRACT

A coated tool includes a base body and a coating film. The coated tool has a first surface with a rake face, a second surface with a flank face, and a third surface located between the first surface and the second surface and being a C surface or an R surface. The coating film includes a first coating film located on the first surface and/or a second coating film located on the second surface, and a third coating film located on the third surface. A wavenumber of a maximum Raman peak of the first coating film is a first wavenumber, a wavenumber of a maximum Raman peak of the second coating film is a second wavenumber, and a wavenumber of the maximum Raman peak of the third coating film is a third (Continued)

wavenumber. The third wavenumber is smaller than the first wavenumber and the second wavenumber.

11 Claims, 5 Drawing Sheets

(51) Int. Cl.
    *C04B 35/5831*     (2006.01)
    *C04B 41/52*     (2006.01)

(52) U.S. Cl.
    CPC ........ *C04B 41/52* (2013.01); *B23B 2228/105* (2013.01); *Y10T 428/24975* (2015.01)

(56) References Cited

U.S. PATENT DOCUMENTS

| | | | |
|---|---|---|---|
| 10,179,366 B2 | 1/2019 | Minami et al. | |
| 2007/0056413 A1* | 3/2007 | Krenzer | B23B 27/141 |
| | | | 82/1.11 |
| 2017/0072474 A1* | 3/2017 | Minami | B27B 33/02 |

FOREIGN PATENT DOCUMENTS

| | | | |
|---|---|---|---|
| JP | H02048103 A | 2/1990 | |
| JP | H10071507 A | 3/1998 | |
| JP | 2002003284 A | 1/2002 | |
| JP | 2004255488 A | 9/2004 | |
| JP | 4500810 B2 | 7/2010 | |
| WO | 2015146507 A1 | 10/2015 | |

* cited by examiner

COATED TOOL AND CUTTING TOOL

CROSS-REFERENCE TO RELATED APPLICATIONS

This application is the national stage application of International Application No. PCT/JP2021/046379, filed on Dec. 15, 2021, which designates the United States and which claims the benefit of priority from Japanese Patent Application No. 2020-217989, filed on Dec. 25, 2020.

TECHNICAL FIELD

The present disclosure relates to a coated tool and a cutting tool.

BACKGROUND OF INVENTION

As a tool used for cutting processing such as turning processing or milling processing, a coated tool is known in which a surface of a base body made of cemented carbide, cermet, ceramic or the like is coated with a coating film to improve wear resistance, etc. (refer to Patent Document 1). A coated tool is known in which a part of the coating film is removed to expose a part of the base body (refer to Patent Document 2).

CITATION LIST

Patent Literature

Patent Document 1: JP 2002-3284 A
Patent Document 2: JP 4500810 B

SUMMARY

A coated tool according to an aspect of the present disclosure is a coated tool including a base body and a coating film located on the base body. The coated tool has a first surface with a rake face, a second surface with a flank face, and a third surface located between the first surface and the second surface and being a C surface or an R surface. The coating film includes a first coating film located on the first surface and/or a second coating film located on the second surface, and a third coating film located on the third surface. When a wavenumber of a maximum Raman peak of the first coating film is referred to as a first wavenumber, a wavenumber of a maximum Raman peak of the second coating film is referred to as a second wavenumber, and a wavenumber of a maximum Raman peak of the third coating film is referred to as a third wavenumber, the third wavenumber is smaller than the first wavenumber and the second wavenumber.

A cutting tool according to an aspect of the present disclosure includes a holder having a rod-shape and including a pocket at an end portion thereof; and the coated tool located in the pocket.

DESCRIPTION OF EMBODIMENTS

The following is a detailed description of a coated tool and a cutting tool according to the present disclosure (hereinafter referred to as "embodiments") with reference to the drawings. It should be noted that the coated tool and the cutting tool according to the present disclosure are not limited by the embodiments. In addition, embodiments can be appropriately combined so as not to contradict each other in terms of processing content. In the following embodiments, the same portions are denoted by the same reference signs, and overlapping explanations are omitted.

In the embodiments described below, expressions such as "constant", "orthogonal", "vertical", and "parallel" may be used, but these expressions do not need to be exactly "constant", "orthogonal", "vertical", and "parallel". In other words, each of the above-described expressions allows for deviations in, for example, manufacturing accuracy, positioning accuracy, and the like.

A coated tool is known in which a surface of a base body made of a cemented carbide, cermet, ceramic or the like is coated with a coating film to improve wear resistance, etc. Coated tools of this type have room for further improvement in terms of increasing durability.

Coated Tool

Figure 1:
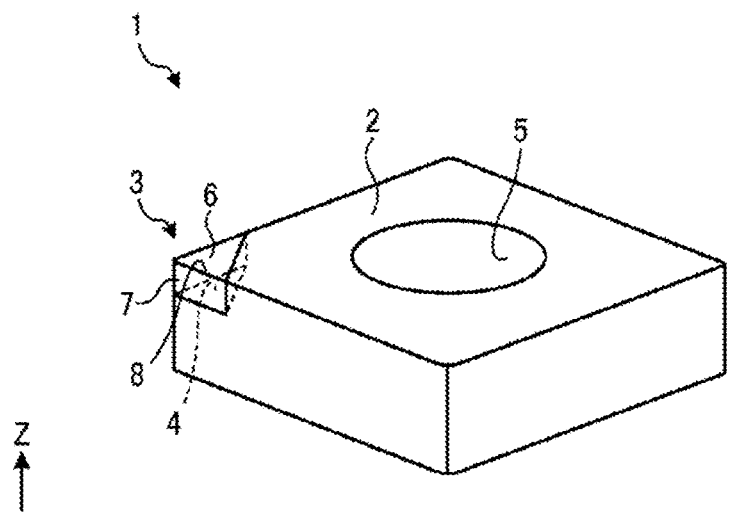
FIG. 1 is a perspective view illustrating an example of a coated tool according to an embodiment.

FIG. 1 is a perspective view illustrating an example of a coated tool according to an embodiment. As illustrated in FIG. 1, a coated tool 1 according to the embodiment includes a tip body 2 and a cutting edge portion 3. The coated tool 1 according to the embodiment has, for example, a hexahedral shape in which shapes of an upper surface and a lower surface (surfaces intersecting the Z-axis illustrated in FIG. 1) are parallelograms.

Tip Body 2

The tip body 2 is formed of, for example, cemented carbide. The cemented carbide contains tungsten (W), specifically, tungsten carbide (WC). The cemented carbide may contain nickel (Ni) and/or cobalt (Co). The tip body 2 may be formed of a cermet. The cermet contains, for example, titanium (Ti), specifically, titanium carbide (TiC) or titanium nitride (TiN). The cermet may contain Ni or Co.

A seat 4 for attaching the cutting edge portion 3 is located in a corner portion of the tip body 2. In addition, a through hole 5 that vertically penetrates the tip body 2 is located in the center portion of the tip body 2. A screw 75 for attaching the coated tool 1 to a holder 70 described later is inserted into the through hole 5 (refer to FIG. 6).

Cutting Edge Portion 3

The cutting edge portion 3 is integrated with the tip body 2 by being attached to the seat 4 of the tip body 2.

The cutting edge portion 3 has a first surface 6 (here, an upper surface) and a second surface 7 (here, a side surface) that is connected to the first surface 6. In the embodiment, the first surface 6 functions as a "rake face" for scooping chips generated by cutting, and the second surface 7 functions as a "flank face". A cutting edge 8 is located on at least a part of a ridge line on which the second face 6 and the third face 7 intersect. The coated tool 1 is configured to cut a work material by bringing the cutting edge 8 into contact with the work material.

Figure 2:
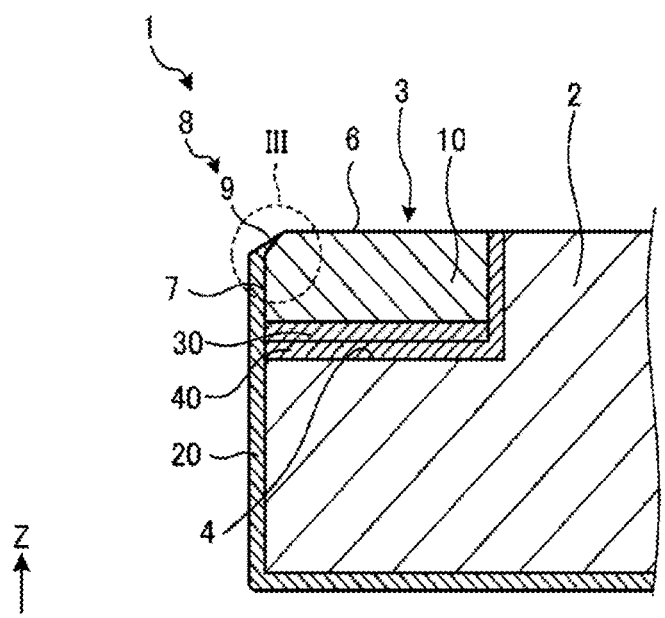
FIG. 2 is a side sectional view illustrating the example of the coated tool according to the embodiment.

The configuration of the cutting edge portion 3 will be described with reference to FIG. 2. FIG. 2 is a side sectional view illustrating an example of the coated tool 1 according to the embodiment. As illustrated in FIG. 2, the cutting edge portion 3 has a base body 10 and a coating film 20.

Base Body 10

The base body 10 contains a plurality of boron nitride particles. In the embodiment, the base body 10 is a cubic boron nitride (cBN) sintered compact and is made of a boron nitride sintered compact containing a plurality of cubic boron nitride particles. The base body 10 may have a binder phase containing TiN, Al, $Al_2O_3$, etc. among the plurality of boron nitride particles. The plurality of boron nitride particles are strongly bonded by such a binder phase. Note that the base body 10 does not necessarily have a binder phase.

The cutting edge 8 has a third surface 9 continuous with the first surface 6 and the second surface 7. The third surface 9 is, for example, a C surface (chamfered face) obtained by obliquely and linearly cutting a corner portion between the first surface 6 and the second surface 7. The third surface 9 is not limited thereto, and may be an R surface (round surface) obtained by rounding the corner portion between the first surface 6 and the second surface 7.

A substrate 30 made from, for example, cemented carbide or cermet may be located on the lower surface of the base body 10. In this case, the base body 10 is bonded to the seat 4 of the tip body 2 via the substrate 30 and a bonding material 40. The bonding material 40 is, for example, a brazing material. In a portion other than the seat 4 of the tip body 2, the base body 10 may be bonded to the tip body 2 via the bonding material 40.

Coating Film 20

The base body 10 is coated with the coating film 20 for the purpose of, for example, improving wear resistance, heat resistance, etc. of the cutting edge portion 3. In the example in FIG. 2, the coating film 20 is located on both the tip body 2 and the cutting edge portion 3, but the coating film 20 may be located at least on the base body 10. When the coating film 20 is located on the side surface of the base body 10 corresponding to the second surface 7 of the cutting edge portion 3, the wear resistance and heat resistance of the second surface 7 are high.

The coating film 20 includes a third coating film located on the third surface 9. The coating film 20 includes a first coating film located on the first surface 6 and/or a second coating film located on the second surface 7. The coating film 20 may include both the first coating film and the second coating film.

Figure 3:
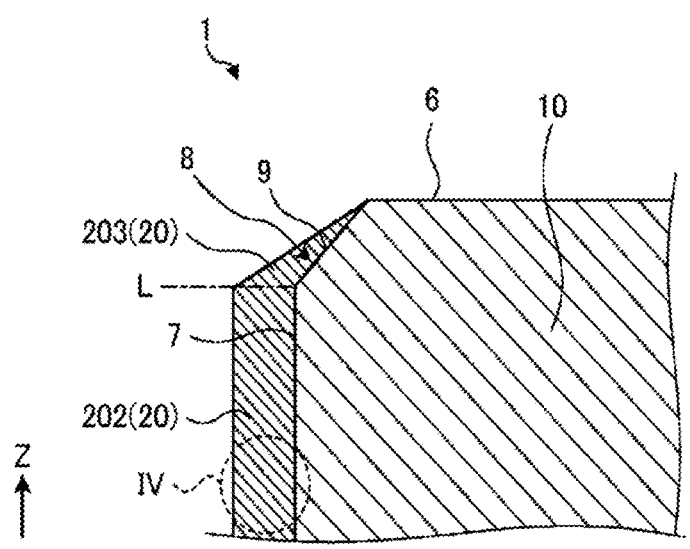
FIG. 3 is a schematic enlarged view of an III portion illustrated in FIG. 2.

FIG. 3 is a schematic enlarged view of an III portion illustrated in FIG. 2. In the example shown in FIGS. 2 and 3, the coating film 20 includes the second coating film and the third coating film, and does not include the first coating film. As shown in FIG. 3, the coating film 20 includes a second coating film 202 located on the second surface 7, and a third coating film 203 located on the third surface 9. Note that a boundary line between the second coating film 202 and the third coating film 203 may be defined by, for example, a virtual line L extending from a boundary between the second surface 7 and the third surface 9 parallel to the first surface 6.

Here, a wavenumber of a maximum Raman peak of the second coating film 202 is referred to as a second wavenumber, and a wavenumber of a maximum Raman peak of the third coating film 203 is referred to as a third wavenumber. The "wavenumber of the maximum Raman peak" refers to a wavenumber at which the scattering intensity becomes a maximum value in a Raman spectrum obtained by irradiating a surface of the coating film 20 (here, the second coating film 202 or the third coating film 203) with laser light.

In general, when residual stress is present in a coating film, the maximum Raman peak of the coating film is shifted to a high wavenumber side, as compared with the maximum Raman peak when no residual stress is present. Therefore, the smaller the wavenumber of the maximum Raman peak, the smaller the residual stress. The smaller the residual stress, the less likely the coating film is to be peeled off or crack.

In general, in a coated tool in which the entire surface of the base body is covered with a coating film, the coating film on the third surface 9 located at the corner portion is thicker than those on the first surface 6 and the second surface 7. In such a form, the wavenumber of the maximum Raman peak of the coating film located on the third surface 9 is larger than the wavenumbers of the maximum Raman peaks of those on the first surface 6 and the second surface 7. That is, the residual stress of the coating film on the third surface is greater than the residual stress of the coating films on the first surface 6 and the second surface 7. Therefore, the coating film on the third surface 9 easily fractures.

In contrast, in the coated tool 1 according to the embodiment, the third wavenumber that is the wavenumber of the maximum Raman peak of the third coating film 203 is smaller than the second wavenumber that is the wavenumber of the maximum Raman peak of the second coating film 202. The third coating film 203 has smaller residual stress and is less likely to be peeled off or crack, as compared with the second coating film 202. Therefore, the coated tool 1 having the third coating film 203 has high durability.

The third wavenumber may be smaller than the second wavenumber by 1 $cm^{-1}$ or more. The third wavenumber may be smaller than the second wavenumber by 3 $cm^{-1}$ or more. This can further enhance the durability of the coated tool 1. Note that, in such a form, the thickness of the coating film on the third surface 9 may be made thinner than the thicknesses of the coating films on the first surface 6 and the second surface 7.

As shown in FIG. 3, in the coated tool 1 according to the embodiment, the base body 10 may be exposed on the first surface 6. In other words, the coating film 20 may not be present on the first surface 6. In the coated tool 1 according to the embodiment shown in FIG. 3, the coating film 20 is located on the second surface 7 and the third surface 9.

As a result of intensive studies, the inventors of the present application have found that the fracture resistance of the coated tool 1 is improved when the coating film 20 is not provided on the first surface 6, as compared with a case where the coating film 20 is provided on the first surface 6 corresponding to the rake face. The reason for this is considered to be that, for example, when the coating film 20 fractures, the entire base body 10 as a base material is damaged.

Therefore, in the coated tool 1 according to the embodiment, the first surface 6 corresponding to the rake face is exposed while the second surface 7 corresponding to the flank face and third surface 9 corresponding to the cutting edge 8 are covered with the coating film 20. The coated tool 1 having such a configuration has high fracture resistance.

The coated tool 1 according to the embodiment has the coating film 20 on the second surface 7 corresponding to the flank face and the third surface 9 corresponding to the cutting edge 8. The coated tool 1 having such a configuration has high wear resistance and high heat resistance. Note that the coated tool 1 may have the coating film 20 on at least the second surface 7.

The thickness of the coating film 20 (third coating film 203) on the third surface 9 may be thinner than the thickness of the coating film 20 (second coating film 202) on the second surface 7. When the thickness of the coating film 20 on the second surface 7 is made thin, damage to the entirety of the base body 10 when the coating film 20 is broken is suppressed. Therefore, the coated tool 1 having such a configuration has higher fracture resistance. For example, the thickness of the coating film 20 on the second surface 7 may be 0.5 µm or more and 5.0 µm or less. The thickness of the coating film 20 on the third surface 9 may be 0.01 µm or more and less than 5.0 µm.

Note that the "thickness of the coating film 20 on the second surface 7 is 0.5 µm or more and 5.0 µm or less (0.01 µm or more and less than 5.0 µm)" means that both the minimum value and the maximum value of the thickness of the coating film 20 on the second surface 7 fall within the range of 0.5 µm or more and 5.0 µm or less (0.01 µm or more and less than 5.0 µm).

The thickness of the coating film 20 on the third surface 9 may be thinner in a region close to the first surface 6 than in a region close to the second surface 7. For example, the thickness of the coating film 20 located on the third surface 9 may become gradually thicker from the first surface 6 toward the second surface 7. The coated tool 1 having such a configuration has favorable balance among fracture resistance, wear resistance, and heat resistance.

Although the example in which the base body 10 is exposed on the first surface 6 has been described here, the first surface 6 may also be covered with the coating film 20. In other words, the coating film 20 may cover the first surface 6, the second surface 7, and the third surface 9.

When a part of the coating film 20 located on the first surface 6 is referred to as a first coating film and a wavenumber of a maximum Raman peak of the first coating film is referred to as a first wavenumber, the third wavenumber may be smaller than the first wavenumber and the second wavenumber by 1 $cm^{-1}$ or more. In this case, the durability of the coated tool 1 can be improved. The third wavenumber may also be smaller than the first wavenumber and the second wavenumber by 3 $cm^{-1}$ or more. In this case, the durability of the coated tool 1 can be further improved.

The coating film 20 may cover the first surface 6 and the third surface 9. That is, the base body 10 may be exposed on the second surface 7.

In order to form the coating film in such a form, for example, when the coating film is not provided on the first surface 6 or the second surface 7, masking or the like may be performed on the first surface 6 or the second surface 7 so that the base body 10 on the first surface 6 or the second surface 7 is exposed. After forming the coating film on the first surface 6, the second surface 7, and the third surface, the coating film coated on the first surface 6 or the second surface 7 may be removed.

The coating film on the third surface 9 may be formed thinner than the other surfaces by using a shielding plate or the like. After forming the coating film on the third surface 9, a part of the coating film may be removed to make the coating layer on the third surface 9 thinner than the coating layer on the other surfaces.

Although the example in which the thickness of the third coating film 203 is thinner than the thickness of the second coating film 202 has been described here, the thickness of the third coating film 203 may be the same as the thickness of the second coating film 202. In this case, in order to make the third wavenumber smaller than the first wavenumber and the second wavenumber, for example, by changing a composition of the coating film, a difference in thermal expansion coefficient between the third coating film and the base body 10 may be made smaller than a difference in thermal expansion coefficient between the first coating film 201 and second coating film 202 and the base body 10.

Specific Configuration of Coating Film 20

Figure 4:
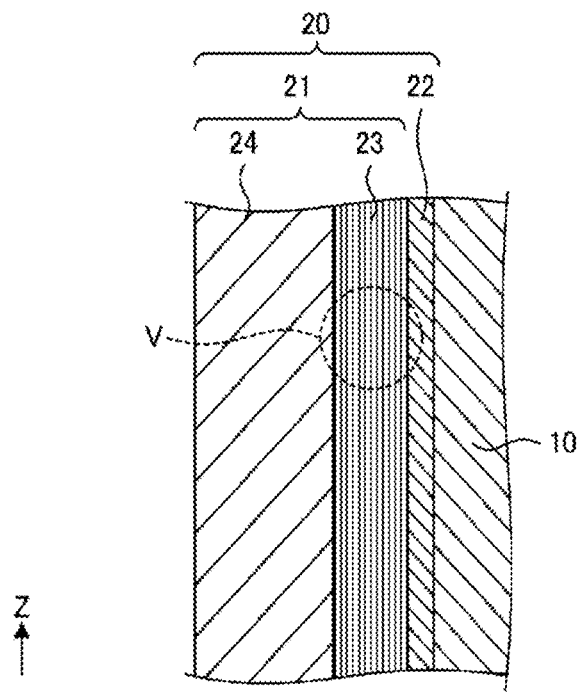
FIG. 4 is a schematic enlarged view of an IV portion illustrated in FIG. 3.

A specific configuration of the coating film 20 will be described with reference to FIG. 4. FIG. 4 is a schematic enlarged view of an IV portion illustrated in FIG. 3.

As illustrated in FIG. 4, the coating film 20 has at least a hard layer 21. The hard layer 21 may have one or more metal nitride layers. The hard layer 21 is a layer having excellent wear resistance, as compared with a metal layer 22. The hard layer 21 may be one layer. Additionally, as illustrated in FIG. 4, a plurality of metal nitride layers may be overlapped. Additionally, the hard layer 21 may include a laminate portion 23 in which a plurality of metal nitride layers are layered, and a third metal nitride layer 24 located above the laminate portion 23. The configuration of the hard layer 21 will be described later.

Metal Layer 22

The coating film 20 may also include a metal layer 22. The metal layer 22 is located between the base body 10 and the hard layer 21. Specifically, the metal layer 22 has one surface (here, a lower surface) in contact with the upper surface of the base body 10 and another surface (here, an upper surface) in contact with the lower surface of the hard layer 21.

The metal layer 22 has a higher adhesion to the base body 10 than to the hard layer 21. Examples of metal elements having such characteristics include Zr, V, Cr, W, Al, Si, and Y. The metal layer 22 contains at least one metal element among the above-described metal elements.

Note that a simple substance of Ti, a simple substance of Zr, a simple substance of V, a simple substance of Cr, and a simple substance of Al are not used as the metal layer 22. These are not suitable for use in cutting tools because all of these materials have a low melting point and low oxidation resistance. In addition, a simple substance of Hf, a simple substance of Nb, a simple substance of Ta, and a simple substance of Mo have low adhesion to the base body 10. However, this does not apply to alloys containing Ti, Zr, V, Cr, Ta, Nb, Hf, and Al.

The metal layer 22 may be an Al—Cr alloy layer containing an Al—Cr alloy. Since the metal layer 22 has particularly high adhesion to the base body 10, the effect of improving the adhesion between the base body 10 and the coating film 20 is high.

When the metal layer 22 is an Al—Cr alloy layer, the Al content in the metal layer 22 may be greater than the content of Cr in the metal layer 22. For example, the composition ratio (atomic %) of Al and Cr in the metal layer 22 may be 70:30. With such a composition ratio, the adhesion between the base body 10 and the metal layer 22 is higher.

The metal layer 22 may contain components other than the metal elements (Zr, V, Cr, W, Al, Si, Y). However, from the perspective of adhesion to the base body 10, the metal layer 22 may contain at least 95 atomic % or more of the metal elements in a combined amount. More preferably, the metal layer 22 may contain 98 atomic % or more of the metal elements in a combined amount. For example, in a case where the metal layer 22 is an Al—Cr alloy layer, the metal layer 22 may contain at least 95 atomic % or more of Al and Cr in a combined amount. Furthermore, the metal layer 22 may contain at least 98 atomic % or more of Al and Cr in a combined amount. Note that the proportion of the metal components in the metal layer 22 can be identified by, for example, analysis using an energy dispersive X-ray spectrometer (EDS).

In addition, since Ti has poor wettability with the base body 10 according to the embodiment, it is preferable that the metal layer 22 does not contain Ti as much as possible from the viewpoint of improving adhesion with the base body 10. Specifically, the Ti content in the metal layer 22 may be 15 atomic % or less.

As described above, in the coated tool 1 according to the embodiment, by providing the metal layer 22 having higher wettability with the base body 10 than the hard layer 21 between the base body 10 and the hard layer 21, it is possible to improve the adhesion between the base body 10 and the coating film 20. Since the metal layer 22 has high adhesion to the hard layer 21, the hard layer 21 is less likely to peel off from the metal layer 22.

The cBN used as the base body 10 is an insulator. The cBN as an insulator has room for improvement in adhesion with a film formed by a physical vapor deposition method (PVD). In contrast, in the coated tool 1 according to the embodiment, the metal layer 22 having electrical conductivity is provided on the surface of the base body 10, and thus the adhesion between the hard layer 21 formed by PVD and the metal layer 22 is high.

Hard Layer 21

Figure 5:
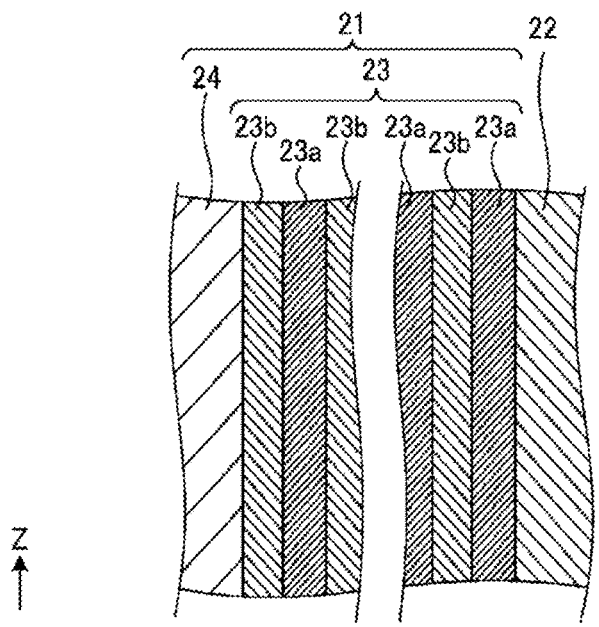
FIG. 5 is a schematic enlarged view of a V portion illustrated in FIG. 4.

The configuration of the hard layer 21 will be described with reference to FIG. 5. FIG. 5 is a schematic enlarged view of a V portion illustrated in FIG. 4.

As illustrated in FIG. 5, the hard layer 21 has a laminate portion 23 located on the metal layer 22 and a third metal nitride layer 24 located on the laminate portion 23.

The laminate portion 23 includes a plurality of first metal nitride layers 23a and a plurality of second metal nitride layers 23b. The laminate portion 23 has a configuration in which the first metal nitride layers 23a and the second metal nitride layers 23b are alternately layered.

The thickness of each of the first metal nitride layer 23a and the second metal nitride layer 23b may be 50 nm or less. In this way, by forming the first metal nitride layer 23a and the second metal nitride layer 23b thin, the residual stress of the first metal nitride layer 23a and the second metal nitride layer 23b is small. As a result, for example, peeling and cracking of the first metal nitride layer 23a and the second metal nitride layer 23b are less likely to occur, so that the durability of the coating film 20 is high.

The first metal nitride layer 23a is a layer that contacts the metal layer 22, and the second metal nitride layer 23b is formed on the first metal nitride layer 23a.

The first metal nitride layer 23a and the second metal nitride layer 23b may contain a metal contained in the metal layer 22.

For example, it is assumed that two kinds of metals (here, "first metal" and "second metal") are included in the metal layer 22. In this case, the first metal nitride layer 23a contains a nitride of the first metal and the third metal. The third metal is a metal not included in the metal layer 22. The second metal nitride layer 23b contains a nitride of the first metal and the second metal.

For example, in the embodiment, the metal layer 22 may contain Al and Cr. In this case, the first metal nitride layer 23a may contain Al. Specifically, the first metal nitride layer 23a may be an AlTiN layer containing AlTiN, which is a nitride of Al and Ti. The second metal nitride layer 23b may be an AlCrN layer containing AlCrN, which is a nitride of Al and Cr.

In this way, the first metal nitride layer 23a containing the metal contained in the metal layer 22 is located on the metal layer 22, and thus the adhesion between the metal layer 22 and the hard layer 21 is high. This makes it difficult for the hard layer 21 to peel off from the metal layer 22, so the durability of the coating film 20 is high.

The first metal nitride layer 23a, that is, the AlTiN layer is excellent in terms of, for example, wear resistance in addition to adhesion to the metal layer 22 described above. The second metal nitride layer 23b, that is, the AlCrN layer, has excellent heat resistance and oxidation resistance, for example. In this manner, the coating film 20 includes the first metal nitride layer 23a and the second metal nitride layer 23b having different compositions from each other, and thus properties such as wear resistance and heat resistance of the hard layer 21 can be controlled. Accordingly, the tool life of the coated tool 1 can be extended. For example, in the hard layer 21 according to the embodiment, mechanical properties such as adhesion with the metal layer 22 and wear resistance can be improved while maintaining excellent heat resistance of AlCrN.

Note that the laminate portion 23 may be formed by, for example, an arc ion plating method (AIP method). The AIP method is a method in which target metals (here, an AlTi target and an AlCr target) are evaporated by using an arc discharge in a vacuum atmosphere, and are combined with $N_2$ gas to form metallic nitrides (here, AlTiN and AlCrN). Note that the metal layer 22 may also be formed by the AIP method.

The third metal nitride layer 24 may be located on the laminate portion 23. Specifically, the third metal nitride layer 24 is in contact with the second metal nitride layer 23b of the laminate portion 23. The third metal nitride layer 24 is, for example, a metal nitride layer (AlTiN layer) containing Ti and Al similar to the first metal nitride layer 23a.

The thickness of the third metal nitride layer 24 may be greater than each thickness of the first metal nitride layer 23a and the second metal nitride layer 23b. Specifically, as described above, when the thickness of the first metal nitride layer 23a and the second metal nitride layer 23b is 50 nm or less, the thickness of the third metal nitride layer 24 may be 1 µm or more. For example, the thickness of the third metal nitride layer 24 may be 1.2 µm.

As a result, for example, when the coefficient of friction of the third metal nitride layer 24 is low, the welding resistance of the coated tool 1 can be improved. In addition, for example, when the hardness of the third metal nitride layer 24 is high, the wear resistance of the coated tool 1 can be improved. In addition, for example, when the oxidation start temperature of the third metal nitride layer 24 is high, the oxidation resistance of the coated tool 1 can be improved.

The thickness of the third metal nitride layer 24 may be greater than the thickness of the laminate portion 23. Specifically, in the embodiment, when the thickness of the laminate portion 23 is 0.5 µm or less, the thickness of the third metal nitride layer 24 may be 1 µm or more. For example, when the thickness of the laminate portion 23 is 0.3 µm, the thickness of the third metal nitride layer 24 may be 1.2 µm. In this way, the third metal nitride layer 24 is thicker than the laminate portion 23, and thus the effect of improving the welding resistance, wear resistance, etc. described above is further enhanced.

The thickness of the metal layer 22 may be, for example, 0.1 µm or more and less than 0.6 µm. That is, the metal layer 22 may be thicker than each of the first metal nitride layer 23a and the second metal nitride layer 23b, and may be thinner than the laminate portion 23.

Cutting Tool

Figure 6:
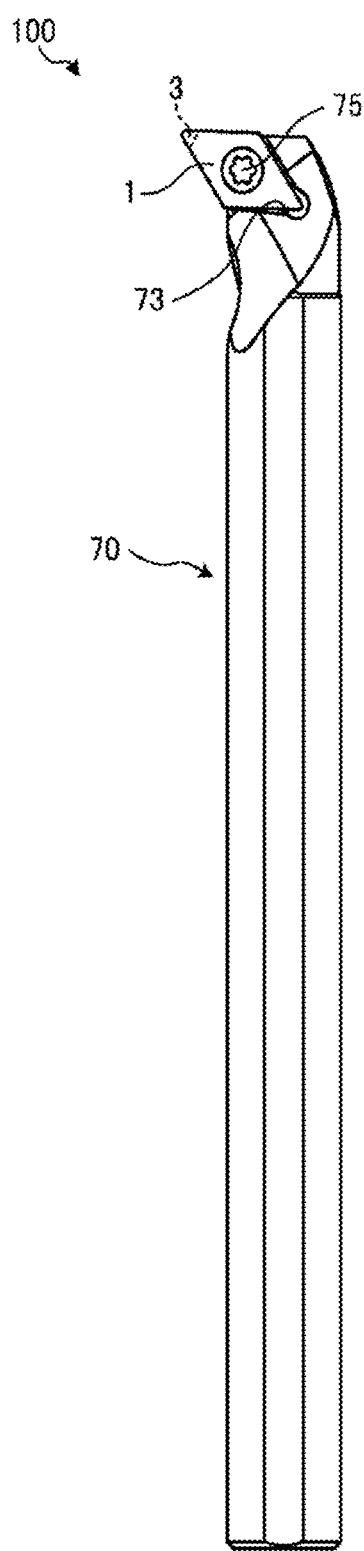
FIG. 6 is a front view illustrating an example of a cutting tool according to the embodiment.

A configuration of a cutting tool including the coated tool 1 described above will be described with reference to FIG. 6. FIG. 6 is a front view illustrating an example of a cutting tool according to the embodiment.

As illustrated in FIG. 6, a cutting tool 100 according to the embodiment includes the coated tool 1 and a holder 70 for fixing the coated tool 1.

The holder 70 is a rod-shaped member that extends from a first end (upper end in FIG. 6) toward a second end (lower end in FIG. 6). The holder 70 is made of, for example, steel or cast iron. In particular, it is preferable to use steel having high toughness among these members.

The holder 70 has a pocket 73 at an end portion on the first end side. The pocket 73 is a portion in which the coated tool 1 is mounted, and has a seating surface intersecting with the rotation direction of the work material and a binding side surface inclined with respect to the seating surface. A screw hole into which a screw 75 described later is screwed is provided on the seating surface.

The coated tool 1 is located in the pocket 73 of the holder 70, and is mounted on the holder 70 by the screw 75. That is, the screw 75 is inserted into the through hole 5 of the coated tool 1, and the tip end of the screw 75 is inserted into the screw hole formed in the seating surface of the pocket 73, and the screw portions are screwed together. Thus, the coated tool 1 is mounted on the holder 70 such that the cutting edge 8 (see FIG. 1) protrudes outward from the holder 70.

In the embodiment, a cutting tool used for so-called turning processing is exemplified. Examples of the turning processing include boring, external turning, and groove-forming. Note that, a cutting tool is not limited to those used in the turning processing. For example, the coated tool 1 may be used as a cutting tool used for milling processing.

For example, the cutting processing of the work material includes the steps of (1) rotating a work material, (2) bringing the cutting edge 8 of the coated tool 1 into contact with the rotating work material to cut the work material, and (3) separating the coated tool 1 from the work material. Here, representative examples of the material of the work material include carbon steel, alloy steel, stainless steel, cast iron, non-ferrous metals, etc.

EXAMPLES

Examples of the present disclosure will be described below. The present disclosure is not limited to the following examples.

First, 72 to 82 vol % of TiN raw powder, 13 to 23 vol % of Al raw powder, and 1 to 11 vol % of $Al_2O_3$ raw powder are prepared. Then, an organic solvent is added to each raw powder prepared. As the organic solvent, alcohols such as acetone and isopropyl alcohol (IPA) may be used. Then, the resultant mixture is milled and mixed for 20 to 24 hours with a ball mill. After the milling and mixing, the solvent is evaporated, whereby a first mixture powder is produced.

cBN powder having an average particle diameter of 2.5 to 4.5 µm and cBN powder having an average particle diameter of 0.5 to 1.5 µm are mixed in a volume ratio of 8:2 to 9:1. An organic solvent is further added. As the organic solvent, alcohols such as acetone and IPA may be used. Then, the resultant mixture is milled and mixed for 20 to 24 hours with a ball mill. After the milling and mixing, the solvent is evaporated, whereby a second mixture powder is produced.

The resulting first mixture powder and second mixture powder are mixed in a volume ratio of 68:32 to 78:22. An organic solvent and an organic binder are added to the mixture powder. As the organic solvent, alcohols such as acetone and IPA may be used. As the organic binder, paraffin, acrylic resin, or the like may be used. Thereafter, the mixture is milled and mixed for 20 to 24 hours with the ball mill, and then the organic solvent is additionally evaporated, whereby a third mixture powder is produced. Note that a dispersant can be added as necessary in the step using the ball mill.

The third mixture powder is molded into a molded object of a predetermined shape. A known method such as uniaxial pressing or cold isostatic pressing (CIP) may be used for the molding. The molded object is heated to a predetermined temperature within a range from 500° C. to 1000° C., whereby the organic binder is evaporated and removed.

The molded object is loaded into an ultra-high pressure heating device, and is heated at 1200° C. to 1500° C. for 15 to 30 minutes under a pressure of 4 to 6 GPa. As a result, the cubic boron nitride sintered compact according to the embodiment is obtained. The obtained cubic boron nitride sintered compact is attached to a seat of a tip body made of cemented carbide via a bonding material. As a result, the tip according to an Example is obtained.

A jig having the same size as the obtained tip is located on an upper surface (rake face) of the tip. That is, the upper surface (rake face) of the tip is covered with the jig. As a result, the rake face is in contact with the jig, and no film is formed on the rake face. The jig is located above the third surface 9 with a gap therebetween. As a result, a film thickness formed on the third surface 9 is thinner than a film thickness formed on the second surface 7. In this state, a coating film is formed on a surface of the tip by a physical vapor deposition (PVD) method. Thereby, a coated tool according to the Example in which the flank face and the chamfered face are covered with the coating film and the rake face is exposed is obtained.

The jig described above is located in the vicinity of the chamfered face of the tip. For this reason, vapor deposition on the chamfered face is suppressed by the jig described above. As a result, the thickness of the coating film located on the chamfered face is thinner than the thickness of the coating film located on the flank face.

As Comparative Example 1, a sample was prepared in which a coating film was formed on the entire surface of the base body without using the jig described above. As Comparative Example 2, a sample was prepared in which the coating film was removed from the third surface 9 of the coated tool according to Comparative Example 1 described above.

Raman Spectroscopic Analysis

The coating film (second coating film 202) located on the flank face and the coating film (third coating film 203) located on the chamfered face of the coated tools according to the Example and Comparative Example 1 were subjected to Raman spectroscopic analysis under the following conditions.

Measurement Conditions

Measurement apparatus: (example) Laser Raman Spectrometer HR800 (manufactured by Horiba, Ltd.)
Laser wavelength: (example) 514.79 nm
Grating: 600T
Objective lens: ×100

Detector: CCD
Detection wavenumber: 100 to 800 cm$^{-1}$

Figure 7:
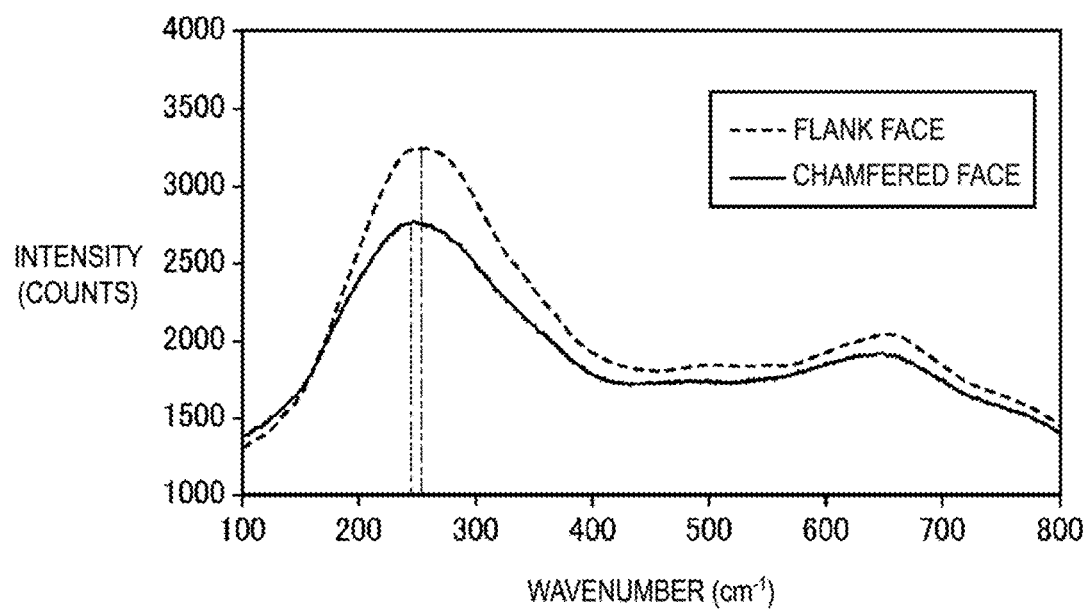
FIG. 7 is a graph showing a result of Raman spectroscopic analysis on a coated tool according to an Example.
Figure 8:
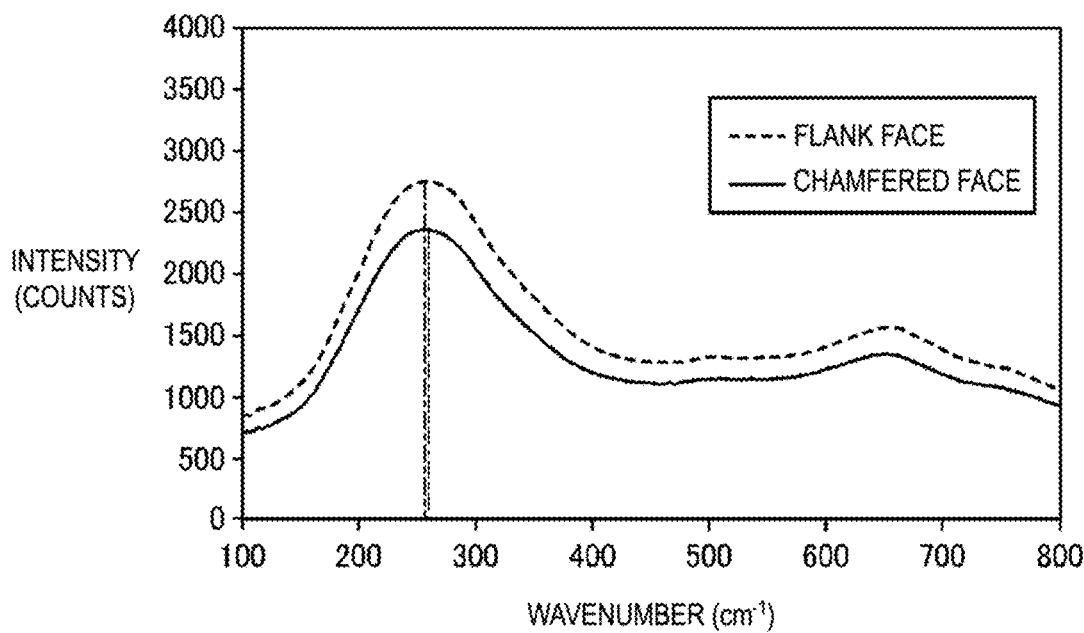
FIG. 8 is a graph showing a result of Raman spectroscopic analysis on a coated tool according to Comparative Example 1.

The intensity (scattering intensity) for each wavenumber can be obtained by performing measurement using the apparatus. In the Example, the measurement using the apparatus was performed five times for each of the coating film located on the flank face and the coating film located on the chamfered face. FIGS. 7 and 8 show graphs obtained by averaging results of the five measurements for each wavenumber. FIG. 7 is a graph showing a result of Raman spectroscopic analysis on the coated tool according to the Example. FIG. 8 is a graph showing a result of Raman spectroscopic analysis on the coated tool according to Comparative Example 1. In FIGS. 7 and 8, the Raman spectrum of the coating film located on the flank face is indicated by a broken line, and the Raman spectrum of the coating film located on the chamfered face is indicated by a solid line.

As shown in FIG. 7, it can be seen that, in the coated tool according to the Example, the wavenumber of the maximum Raman peak of the coating film located on the chamfered face is shifted to a lower wavenumber side than the wavenumber of the maximum Raman peak of the coating film located on the flank face. Specifically, it can be seen that the wavenumber of the maximum Raman peak of the coating film located on the chamfered face is shifted to a lower wavenumber side by about 5 cm$^{-1}$ than the wavenumber of the maximum Raman peak of the coating film located on the flank face.

On the other hand, as shown in FIG. 8, it can be seen that, in the coated tool according to Comparative Example 1, the wavenumber of the maximum Raman peak of the coating film located on the chamfered face is shifted to a higher wavenumber side than the wavenumber of the maximum Raman peak of the coating film located on the flank face. This may be because the coating film on the third surface 9 is formed thicker than the coating film on the second surface, and the residual stress in the third surface 9 is greater. As is apparent from this result, the coating film located on the chamfered face has smaller residual stress and is less likely to be peeled off or crack, as compared with the coating film located on the flank face.

Intermittent Evaluation

The coated tools according to the Example and Comparative Examples 1 and 2 and the coated tool according to the Comparative Example in which the entire surface including the rake face was covered with the coating film were subjected to intermittent evaluation under the following cutting conditions.

Cutting Condition
Cutting method: Turning processing
Work material: SCM415 with 8 holes
Cutting speed: 150 m/min
Feed: 0.2 mm/rev
Depth of cut: 0.2 mm
Cutting state: Wet
Evaluation Method: The Number of Impacts Causing the Cutting Edge to be Fractured As a result of the intermittent evaluation, the cutting tool according to the Example achieved the longest life. The cutting tool according to Comparative Example 1 had the shortest life.

The number of impacts causing the cutting edge to fracture in the coated tool according to the Example was twice or more as large as the number of impacts causing the cutting edge to fracture in the coated tool according to Comparative Example 1. As is apparent from this result, it can be seen that the fracture resistance is improved and the tool life is extended by exposing the rake face.

In the above-described embodiment, the coated tool 1 in which the base body 10 made of boron nitride particles, etc. is attached to the tip body 2 made of cemented carbide, etc. and these are coated with the coating film 20 has been described. Without being limited thereto, the coated tool according to the present disclosure may be, for example, a coated tool in which all of the base body having a hexahedral shape in which the shapes of the upper surface and the lower surface are parallelograms is a cubic boron nitride sintered compact, and a coating film is formed on the base body.

In the embodiment described above, the shape of the upper surface and the lower surface of the coated tool 1 is a parallelogram, but the shape of the upper surface and the lower surface of the coated tool 1 may be a diamond or square. Additionally, the shape of the upper surface and the lower surface of the coated tool 1 may be triangular, pentagonal, hexagonal, etc.

The shape of the coated tool 1 may be of a positive type or negative type. The positive type is a type in which the side surface is inclined with respect to the central axis passing through the center of the upper surface and the center of the lower surface of the coated tool 1, and the negative type is a type in which the side surface is parallel to the central axis.

In the embodiment described above, an example is described in which the base body contains cubic boron nitride (cBN) particles. Although not limited thereto, the base body disclosed in the present application may contain particles such as hexagonal boron nitride (hBN), rhombohedral boron nitride (rBN), wurtzite boron nitride (wBN), etc. The base body is not limited to boron nitride, and may be made of, for example, a cemented carbide, cermet or the like. The cemented carbide contains tungsten (W), specifically, tungsten carbide (WC). Further, the cemented carbide may contain nickel (Ni) or cobalt (Co). The cermet contains, for example, titanium (Ti), specifically, titanium carbide (TiC) or titanium nitride (TiN). Furthermore, the cermet may contain Ni or Co.

In the embodiment described above, the coated tool 1 has been described as being used for cutting processing, but the coated tool according to the present application can also be applied to a tool other than a cutting tool, such as a tool or a cutting edge for excavation.

Further effects and variations can be readily derived by those skilled in the art. Thus, a wide variety of aspects of the present invention are not limited to the specific details and representative embodiments represented and described above. Accordingly, various changes are possible without departing from the spirit or scope of the general inventive concepts defined by the appended claims and their equivalents.

The invention claimed is:
1. A coated tool, comprising:
a base body; and
a coating film located on the base body, wherein
the coated tool comprises
a first surface with a rake face,
a second surface with a flank face, and
a third surface located between the first surface and the second surface and being a C surface or an R surface,
the coating film comprises
a first coating film located on the first surface,
a second coating film located on the second surface, and
a third coating film located on the third surface, and when a wavenumber of a maximum Raman peak of the first coating film is referred to as a first wavenumber, a wavenumber of a maximum Raman peak of the second coating film is referred to as a second wavenumber, and a wavenumber of a maximum Raman peak of the third coating film is referred to as a third wavenumber, the third wavenumber is smaller than both the first wavenumber and the second wavenumber.

2. The coated tool according to claim 1, wherein the third wavenumber is smaller than the first wavenumber and the second wavenumber by 3 $cm^{-1}$ or more.

3. The coated tool according to claim 1, wherein the base body is made of a boron nitride sintered compact containing a plurality of cubic boron nitride particles.

4. The coated tool according to claim 1, wherein a thickness of the third coating film is thinner than a thickness of the second coating film.

5. The coated tool according to claim 1, wherein the third coating film comprises a first region close to the first surface and a second region close to the second surface, and a thickness of the first region is thinner than a thickness of the second region.

6. The coated tool according to claim 1, wherein a thickness of the third coating film is 0.01 µm or more and 5.0 µm or less.

7. The coated tool according to claim 1, wherein the coating film comprises:
 a hard layer; and
 a metal layer other than a simple substance of Ti, Zr, V, Cr, Ta, Nb, Hf, or Al, the metal layer being located between the base body and the hard layer.

8. The coated tool according to claim 7, wherein the metal layer comprises at least one or more elements selected from the group consisting of Zr, Hf, V, Nb, Ta, Cr, Mo, W, Al, Si, and Y.

9. The coated tool according to claim 1, wherein a thickness of the third coating film on the third surface is thinner in a region closer to the first surface than in a region closer to the second surface.

10. The coated tool according to claim 1, wherein a thickness of the third coating film on the third surface becomes gradually thicker from the first surface toward the second surface.

11. A cutting tool, comprising:
 a holder having a rod-shape and comprising a pocket at an end portion thereof; and
 a coated tool located in the pocket, wherein the coated tool comprises:
 a base body; and
 a coating film located on the base body, wherein the coated tool comprises
  a first surface with a rake face,
  a second surface with a flank face, and
  a third surface located between the first surface and the second surface and being a C surface or an R surface,
 the coating film comprises
  a first coating film located on the first surface,
  a second coating film located on the second surface, and
  a third coating film located on the third surface,
 a wavenumber of a maximum Raman peak of the first coating film is a first wavenumber,
 a wavenumber of a maximum Raman peak of the second coating film is a second wavenumber,
 a wavenumber of a maximum Raman peak of the third coating film is a third wavenumber, and
 the third wavenumber is smaller than both the first wavenumber and the second wavenumber.

\* \* \* \* \*